United States Patent [19]

Papa et al.

[11] 3,928,313
[45] Dec. 23, 1975

[54] TRISAZO DYESTUFF

[75] Inventors: Sisto Sergio Papa, Milan; Renzo Ferrario, Ceriano Laghetto (Milan), both of Italy

[73] Assignee: Aziende Colori Nazionali Affini ACNA S.p.A, Milan, Italy

[22] Filed: Jan. 27, 1975

[21] Appl. No.: 544,175

[30] Foreign Application Priority Data
Feb. 4, 1974 Italy................................. 20150/74

[52] U.S. Cl. ................................................. 260/173
[51] Int. Cl.² ..................................... C09B 35/46
[58] Field of Search ............ 260/173, 169, 170, 171, 260/172

[56] References Cited
UNITED STATES PATENTS

| | | | |
|---|---|---|---|
| 858,444 | 7/1907 | Dressel et al. ........................ | 260/173 |
| 859,930 | 7/1907 | Dressel et al. ........................ | 260/173 |
| 971,112 | 9/1910 | Blank et al. ........................... | 260/173 |
| 1,056,493 | 3/1913 | Blank et al. ........................... | 260/173 |
| 2,196,028 | 4/1940 | Roos .................................... | 260/173 X |

*Primary Examiner*—Charles F. Warren
*Attorney, Agent, or Firm*—Hubbell, Cohen, & Stiefel

[57] ABSTRACT

The trisazo dyestuff having the formula:

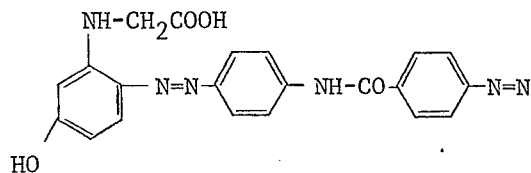

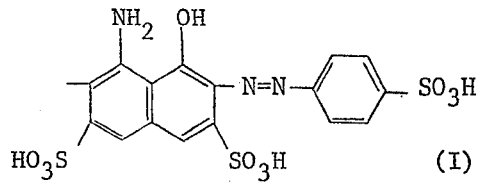

is useful in dyeing polyamide fibers and leather. This compound is prepared by tetraazotizing 4,4'-diaminobenzanilide, after which the obtained tetrazocompound is coupled in an acid medium with 1-amino-8-naphthol-3,6-disulphonic acid to form a diazomonoazo-compound which is then coupled, in an alkaline medium, with the sulphanilic acid diazoderivative and, finally, the diazocompound is coupled in an alkaline medium with meta-hydroxyphenylglycine.

1 Claim, No Drawings

TRISAZO DYESTUFF

CROSS REFERENCE TO RELATED APPLICATIONS

None.

DETAILED DESCRIPTION OF THE INVENTION

The present invention provides a new, acid trisazo dyestuff which is well suited for dyeing natural and synthetic polyamide fibers and in particular, leather, as well as to a process for preparing the dyestuff.

The dyestuff of the invention has the following formula:

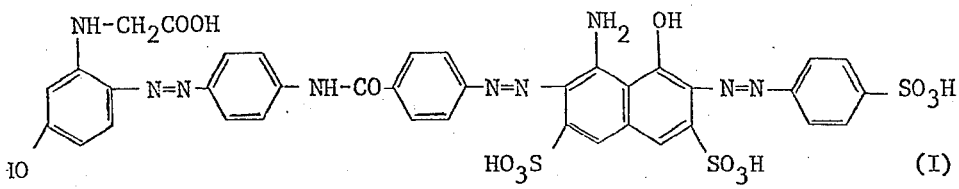

The process for preparing dyestuff (I), comprises tetraazotizing 4,4'-diamino-benzanilide, coupling, in an acid medium, a molecular equivalent of the thus obtained tetrazo-compound with a molecular equivalent of 1-amino-8-naphthol-3,6-disulphonic acid, thereafter coupling, in an alkaline medium, the previously obtained monoazo-diazo compound with a molecular equivalent of the sulphanilic acid diazo-derivative and, finally, coupling, in an alkaline medium, the thus prepared diazo-compound with a molecular equivalent of meta-hydroxy-phenylglycine.

The analogous triazo dyestuff containing meta-diethylaminophenol instead of meta-hydroxy-phenylglycine of dyestuff (I) is known in the art. However, the compound of the invention exhibits, when applied to leather, a remarkably purer and more penetrated shade, while it exhibits, in comparison with the corresponding dyestuff containing meta-amino-phenylglycine, a much higher affinity.

The dyestuff according to the invention dyes natural and synthetic polyamide fibers and in particular leather, regardless of its origin and its tanning type, dark black with greenish shades, such dyeing being well penetrated, provided with a good general stability, especially to abrasion, and exhibiting no tendency to bronzing.

As compared with the benzidinic dyestuffs having characteristics similar to those of the present compound, the compound of the present invention offers important advantages since it avoids the use of the aromatic benzidine diamines which are carcinogenic substances, the use of which require very strict safety measures.

The following example is given to illustrate the invention, without being however, a limitation thereof. All parts and percentages given are by weight, unless otherwise indicated.

EXAMPLE 22.7 Parts of 4,4'-diamino-benzanilide, suspended in 50 parts of water and 58 parts of 20° Be hydrochloric acid, after cooling with 80 parts of ice, were tetraazotized by dropping thereinto, at 0°–2°C., 14 parts of sodium nitrite in 60 parts of water. After stirring for 30 minutes, the excess nitrous acid was removed using sulphamic acid.

30.8 Parts of 1-amino-8-oxynaphthalin-3,6-disulphonic acid, dissolved in 100 parts of water and 14 parts of 36° Be caustic soda, were dropped very slowly, over a period of 2–3 hours, onto the tetrazo solution, while keeping the temperature at 0°–2°C. with ice, and the pH value at 1.3–1.5.

Stirring was carried on for 16–18 hours, first at 0°–2°C. and then at a temperature of 15°–20°C.

In a separate vessel, 16.95 parts of p-amino-benzenesulphonic acid, dissolved in 150 parts of water and 10 parts by volume of 36° Be NaOH, were added with 35 parts by volume of 20% $NaNO_2$ and then dropped onto 150 parts of ice and 25 parts by volume of 20° Be HCl.

After stirring for 15 minutes, the excess nitrous acid was removed using 5 parts by volume of 20% sulphamic acid.

The diazo derivative of the sulphanilic acid thus prepared was poured over 5 minutes onto the monoazo product of the first coupling reaction described above. It was cooled with ice to a temperature of about 0°–2°C., thereby obtaining a mixture having a pH of about 1.6. Subsequently, a suspension of 36 parts of $Na_2CO_3$ in 75 parts by volume of water was added, in a few seconds, so as to bring, as quickly as possible, the pH value from 1.6 to 7.5–8, at a temperature of about 3°C. Coupling was practically completed after 40–50 minutes.

In a separate vessel, 16.7 parts of m-hydroxy-phenylglycine were dissolved in 50 parts of $H_2O$, with the addition of 10 parts of 36° Be NaOH.

The resulting solution was poured into the diazo-disazo-compound having a pH of 7.5–8 and a temperature of 7–8°C. The pH value was adjusted to 8.5–9 by means of 4–5 parts of $Na_2CO_3$. Coupling occurred very rapidly. After stirring for about 1 hour, the mass passed into solution. The thus obtained mass was poured onto a mixture made up of 100 parts of water, 20 parts of NaCl and 70 parts of 20° Be HCl. It was heated to 35°–40°C. for 1 hour. It was then filtered, squeezed off accurately and dried at 70°–80°C. The resulting dyestuff dyes natural and synthetic polyamide fibers black with greenish shades.

In particular, it dyes leather with excellent penetration and in full shades. The m-hydroxy-phenylglycine used in this example was prepared as follows:

A 500 ml. flask was fed with 200 parts of water, 85 parts of monochloroacetic acid, 33 parts of m-aminophenol and 10 parts of crystalline sodium acetate. Stirring was started and the pH was brought to about 6 by means of 80 parts of 36° Be NaOH. It was heated for 1 hour to 93°–96°C. and kept under stirring at such temperature for 6–8 hours, maintaining a pH of about 3.5 by means of 35 parts of 36° Be NaOH.

It was cooled down to 20°C. and a large amount of m-hydroxy-phenylglycine precipitate in the form of fine needles was obtained. It was filtered and dried at 60°C. For the synthesis of the dyestuff, it is possible to utilize the reaction mass directly, without purification.

Variations can, of course, be made without departing from the spirit and scope of the invention.

Having thus described our invention, what we desire to secure by Letters Patent and hereby claim is:

1. A trisazo dyestuff having the formula:

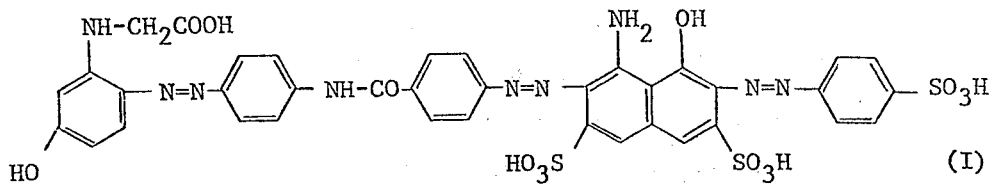

* * * * *

UNITED STATES PATENT OFFICE
CERTIFICATE OF CORRECTION

Patent No. 3,928,313      Dated December 23, 1975

Inventor(s) Sisto Sergio Papa et al

It is certified that error appears in the above-identified patent and that said Letters Patent are hereby corrected as shown below:

Title page, left side under "Foreign Application Priority Data": "20150/74" should read -- 20150-A/74 --.

Column 1, line 36: "triazo" should read -- trisazo --.

Signed and Sealed this thirtieth Day of March 1976

[SEAL]

Attest:

RUTH C. MASON
Attesting Officer

C. MARSHALL DANN
Commissioner of Patents and Trademarks